March 21, 1939. R. SHEPPARD 2,151,569
SPEED GOVERNOR
Filed June 8, 1937
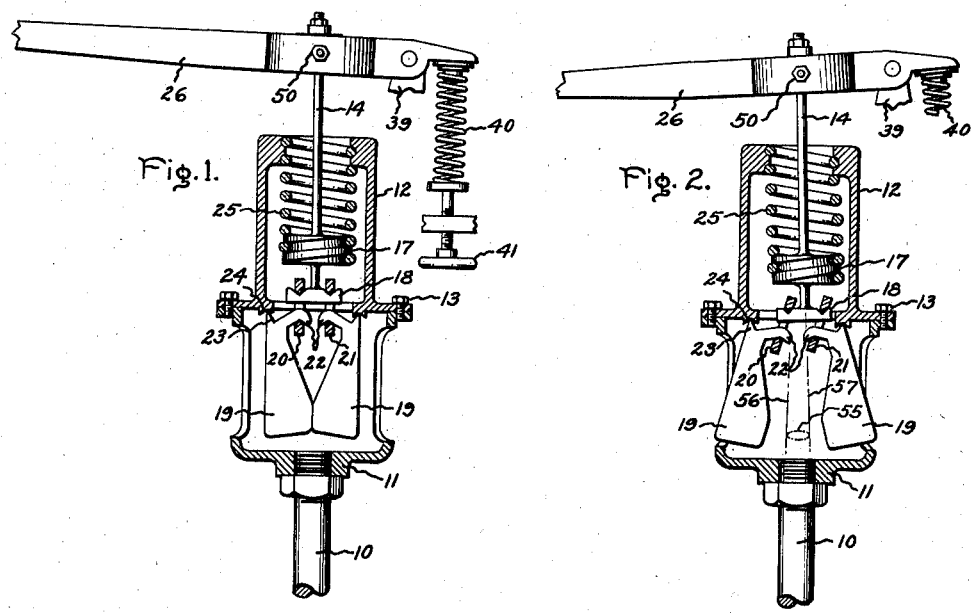
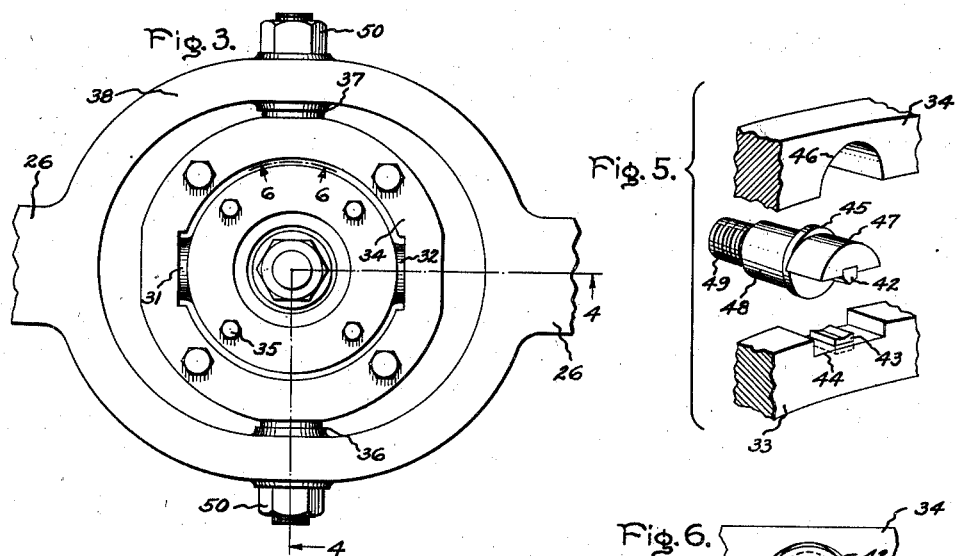
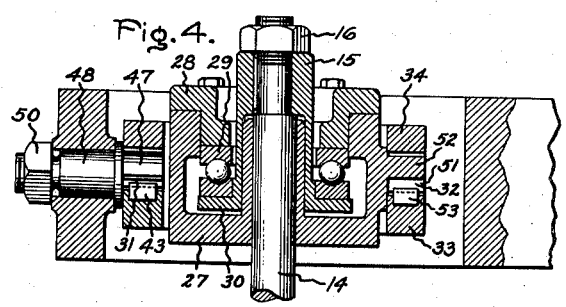
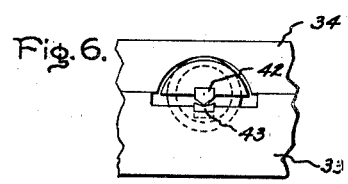
Inventor:
Raymond Sheppard,
by Harry E. Dunham
His Attorney.

Patented Mar. 21, 1939

2,151,569

UNITED STATES PATENT OFFICE 2,151,569

SPEED GOVERNOR

Raymond Sheppard, Schenectady, N. Y., assignor to General Electric Company, a corporation of New York Application June 8, 1937, Serial No. 147,049

3 Claims. (Cl. 264—15)

The present invention relates to speed governors such as are used for example in combination with elastic fluid turbines to control the flow of elastic fluid thereto in response to speed changes. These speed governors or speed-governing mechanisms usually comprise rotatable elements driven by a shaft and connected to a governor lever to move or turn such lever in response to speed changes. The connection between the rotatable elements and the governor lever is accomplished by a transmission bearing in the form of a gimbal bearing whereby vertical motion only is transmitted to the governor lever. By "gimbal bearing" I mean an arrangement based on the principles of the gimbal joint in which a member is supported or connected to two diametrically opposite portions of a ring, which latter is in turn supported on two diametrically opposite points at right angles to the diameter across said portions. An arrangement of this kind includes two pairs of substantially coplanar bearings.

Difficulties have been experienced heretofore with this type of governor due to vibrating motions to which the governor lever is subjected during operation. Such vibrating motion not only causes rapid wear and thereby reduces the life of the governor but in many cases interferes with the operation of the governor in that such vibration is transmitted to elements to be controlled. Various expedients have been resorted to, to overcome these governor lever vibrations, also known as governor bobble and wobbling. For instance, a dashpot has been attached to the vibrating governor lever or beam to dampen the vibrations. Such arrangement although it may be effective as far as the dampening of governor vibrations is concerned reduces considerably the sensitivity of the governing mechanism and is therefore in most cases undesirable. In other cases, spring-loaded friction pads have been applied to squeeze the beam and thus dampen its vibration. Finally, vibration compensators have been applied with a tuned frequency corresponding to that of the vibrating governor beam frequency and 180° out of phase with the latter. Such arrangement naturally increases the cost of the governing mechanism and in addition ordinarily does not completely eliminate vibrations of the governor lever or beam.

The object of my invention is to provide an improved construction and arrangement of speed governors whereby vibration of the governor lever is completely eliminated.

For a consideration of what I believe to be novel and my invention, attention is directed to the following description and the claims appended thereto in connection with the accompanying drawing.

In the drawing Fig. 1 represents a somewhat simplified view of a speed governor embodying my invention; Fig. 2 shows the governor of Fig. 1 in a different operating position; Fig. 3 is an enlarged top view of part of Fig. 1; Fig. 4 is a sectional view along lines 4—4 of Fig. 3; Fig. 5 is a perspective view of a detail of Figs. 3 and 4; and Fig. 6 is a view along line 6—6 of Fig. 3.

The governor comprises a drive shaft 10 which may be driven through a gearing from a turbo shaft (not shown). A lower bracket 11 is secured to the upper end of the drive shaft 10 and an upper bracket 12 is secured by a plurality of bolts 13 to the upper end of the lower bracket 11. The two brackets serve to carry the various rotatable governor elements. These rotatable elements in addition to the brackets include a governor spindle 14 which at its upper end is reduced and carries a hub 15 fastened to the spindle by means of a nut 16. The lower end of the spindle is fastened to a plug 17 which latter carries a support 18 for governor weights 19. The weights 19 are hung by means of links 20, 21 from the support 18. The links have knife edges which fit into bearing V-blocks in the support and under hooked ends 22 of the weights. Knife edges 23 on top of the weights press against V-blocks 24 in the present instance formed in the bottom of the upper bracket 12 to provide fulcrums about which the weights swing during operation. The weights are normally biased into the position shown in Fig. 1, that is, inwardly towards the center of rotation by a tension spring or main spring 25 which has a lower end held in grooves of the plug 17 and an upper end held in grooves formed in the top portion of the upper bracket 12.

The upper end of the spindle 14 is connected to an intermediate point of a governor lever 26 through the intermediary of a gimbal bearing to transmit vertical motion of the rotatable spindle to the lever 26 and eliminate rotary motion of the spindle from transmission to said lever. The gimbal bearing comprises a spindle bearing casing 27 with a cover 28 and a ball bearing 29 held between the cover 28 and a flange 30 on the aforementioned hub 15. During operation, rotation of the spindle 14 together with the hub 15 is not transmitted to the casing 27 and the cover 28. Up and downward movement of the spindle 15, however, is transmitted to the casing 27 and the cover 28. The casing 27 is supported by bearings 31 and 32 on a supporting ring having a lower part 33 and an upper part 34 held together by a plurality of bolts 35. The bearings supporting the casing 27 on the supporting ring will be described more in detail hereinafter. For the present it is sufficient to note that the bearings are formed at opposite points of a diameter of the supporting ring. The supporting ring in turn is supported or connected to the governor lever by two bearings 36 and 37 on a ring-shaped intermediate portion 38 of the lever 26. The right-hand portion of the lever 26 is supported on a fulcrum 39 and the right-hand end portion of the lever is biased upward by a compressed synchronizing spring 40 which may be adjusted by means including a handwheel 41. The synchronizing spring effects an upward thrust on the right-hand end of the lever 26 so that the portion of the lever located to the left of the fulcrum 39 is forced downward whereby unidirectional thrust is maintained on the gimbal bearing. The compression of the synchronizing spring 40 opposes the tension of the main spring 25. Adjustment of the synchronizing spring 40 by turning the handwheel 41 effects a speed change of the turbine or other prime mover being controlled unless the speed of such prime mover is fixed as is for instance the case where a turbine drives a generator connected to an electric line of constant frequency. In such case adjustment of the synchronizing spring effects a load change of the prime mover, that is, causes the prime mover to take on more load or throw off some of its load. Adjustment of the main spring by turning its ends on the plug 17 and on the upper bracket changes the regulation of the governor.

It has been noted above that the bearings 31, 32 for supporting the bearing casing 27 on the supporting ring 33, 34 are provided at opposite points of a diameter of the spindle bearing casing 27. In the present instance this diameter lies in a vertical plane together with the governor lever 26. The other bearings 36, 37 for supporting the supporting ring on the annular portion 38 of the governor lever are provided at opposite points of a diameter of the supporting ring and as regards the relation between this pair of bearings 36, 37 and the first mentioned pair of bearings 31, 32, it is to be noted that the two pairs of bearings are arranged at right angles to each other.

During operation, rotation of the rotatable elements of the governor causes rotation of the hub 15 while the bearing casing 27 and its cover 28 remain stationary. An increase of the speed of rotation causes outward movement of the weights 19 by the action of centrifugal force whereby the spindle 14 is forced downward against the biasing force of the tension of the main spring 25. The downward movement of the spindle is transmitted through the gimbal bearing to the governor lever and causes downward movement of the left-hand end of the latter to control an element connected thereto. In the case of an elastic fluid turbine arrangement, downward movement of the left-hand end of the governor lever causes in known manner closing movement of a valve controlling the admission of elastic fluid to the turbine.

The aforementioned two pairs of bearings 31, 32 and 36, 37 are knife edge bearings. This is an important feature of my invention because with the provision of such knife edge bearings vibration of the governor lever is completely eliminated. One of the bearings 36, 37 is shown in perspective in Fig. 5. It comprises a knife edge 42 in cooperative relation with a V-block 43. The V-block is secured to a recessed portion 44 of the lower part 33 of the supporting ring. The knife edge 42 is secured to a knife edge support 45. The upper part 34 of the supporting ring has a recess 46 for accommodating a front portion 47 of the knife edge support. When assembled, the cylindrical surface of the front portion 47 is slightly spaced from the surface of the recess 46. An intermediate portion 48 is disposed within a bore in the ring portion 38 of the governor lever. A rear or end portion 49 of the knife edge support is screwthreaded to receive a nut 50 in order securely to fasten the knife edge support to the ring portion 38 of the governor lever.

The arrangement of the bearings 31 and 32 in the present instance is similar to that of the pair of bearings 36, 37. Each of the pairs 31, 32 comprises a knife edge 51 (Fig. 4) secured to a knife edge support 52 which in the present instance is formed by a lateral projection of the bearing casing 27. The knife edge 51 engages a V-block 53 secured to a recessed portion of the lower part 33 of the supporting ring.

In the present instance with the bearings 31, 32 located in a plane with the governor lever 26, and with the governor lever 26 supported on a fulcrum 39, it would ordinarily be sufficient to provide knife edge bearings with regard to the bearings 36 and 37 and pin bushing or journal bearings with regard to the bearings 31, 32. To make this clear and to realize the significance of the provision of knife edge bearings instead of pin bushing bearings heretofore provided, attention is directed to certain bearing characteristics and the behavior of governors during operation. The axis of rotation of an ideal governor coincides with the axis of the governor spindle. In practice, mainly due to inaccuracies in manufacturing, a governor is never perfectly balanced. Therefore the axis of the spindle does not coincide with the axis of rotation if the spindle at one point only is fixed and at the other points is free to move laterally in any direction. This is the case with regard to the governor above described where the upper end only of the spindle is fixed to the governor lever whereas the lower end together with the plug 17 and the support 18 is free to move in any direction due to the loose or flexible connection with the weights 19 provided by the links 20, 21. With such an arrangement the spindle no longer rotates about its own axis but the axis of the spindle describes the surface of a cone. In other words, all points of the axis of the spindle except the point of support move along circles, as indicated in wash-dotted lines 55 in Fig. 2. The center line of the cone then becomes the axis of rotation. During each rotation of the governor the spindle describes the entire surface of a cone. The two extreme positions are indicated in Fig. 2 by two dash-dotted lines 56 and 57. For the purpose of our consideration it may be said that the axis of the spindle during operation describes a pendular motion back and forth in the surface of the drawing between the extreme positions indicated by the lines 56, 57. If we assume for a moment that the bearings, in particular the bearings 36, 37, are of the ordinary pin bushing or journal type, then it becomes clear that during this pendular motion each pin is turned back and forth in its bearing support. Each time such pin bushing reaches an end position during its movement and thereupon has to be moved in the opposite direction, it has to overcome the friction at rest which is very high as compared to the friction of motion. Mathematically, it may be said that such friction at rest is infinite as compared to the friction of motion. I have discovered that it is this high friction at rest of ordinary pin bushing bearings which in governors heretofore used caused vibration, bobble and wobbling of the governor lever. Thus, briefly, the cause of the vibration of governors heretofore used lies in inaccuracies of manufacturing of the rotatable elements, especially unbalances of the main spring 25 and secondly in the physical chacteristics of pin bushing or journal bearings which latter have a very high friction at rest so that at rest and during a very short time interval of the starting movement, such pin bushing connection acts like a rigid connection, preventing at the start relative rotation between the rotatable and stationary bearing elements and causing instead movement or rotation of the supporting element, or, from another viewpoint, transmitting rotation of the rotatable bearing element to the supporting element.

With my invention, that is, by the provision of knife edge bearings which have practically no friction at rest, I have completely eliminated vibration of the governor lever. The bearings 36, 37 completely eliminate vibration due to the pendular motion of the spindle between the extreme positions 56, 57 in Fig. 2. The other pair of bearings 31, 32 similarly eliminates the transmission of pendular motion of the spindle between two extreme positions 90 degrees from the positions 55, 56 indicated in Fig. 2. The elimination of this vibration, however, is unimportant in the present instance because it merely results in torsional forces or twisting of the governor lever taken up by the fulcrum 39. Thus, where the governor lever is held on a fulcrum and two bearings 31, 32 of the gimbal bearing are disposed in a plane with the governor lever, it is ordinarily sufficient to provide knife edges for the other bearings only.

Thus, with my invention I have accomplished an improved governor construction whereby vibration of the governor lever is completely eliminated. A governor in accordance with my invention comprises rotatable elements driven by a drive shaft and including a spindle connected to a governor lever by means of a gimbal bearing which latter includes two pairs of bearings angularly spaced to support diametrically opposite portions of a casing on a supporting ring and diametrically opposite portions of such supporting ring on an annular member forming part of the governor lever. At least one pair of said bearings is in the form of knife edge bearings.

What I claim as new and desire to secure by Letters Patent of the United States, is:

1. Speed governor including the combination of a drive shaft, rotatable elements including weights and a governor spindle driven from the drive shaft, a governor lever, and a gimbal bearing connecting the lever to the spindle to transmit vertical motion from the spindle to the lever and to prevent the transmission of rotary motion from the spindle to the lever, said gimbal bearing comprising two pairs of substantially coplanar bearings of which at least one pair is in the form of knife edge bearings to eliminate vibration of the governor lever due to pendular motion of the rotatable elements.

2. Speed governor including the combination of rotatable elements including weights and a spindle, means for driving the rotatable elements, a governor lever, and a gimbal type bearing connecting the lever to the rotatable elements, said gimbal type bearing including two pairs of substantially coplanar bearings, a supporting ring, at least one pair of bearings having knife edges provided on diametrically opposite points of the ring to prevent the setting up of vibration in the governor lever due to unbalance of the rotatable elements.

3. Speed governor including the combination of a drive shaft, bracket means supported on the drive shaft, a spindle, governor weights flexibly supported on the spindle and having portions engaging the bracket means, a spring between the spindle and the bracket means biasing the weights against centrifugal force, a governor lever with an intermediate annular portion, a gimbal bearing connecting said portion to the spindle, said gimbal bearing comprising a casing with a bearing for the spindle, a supporting ring, a pair of bearings supporting diametrically opposite portions of the casing on the supporting ring, and another pair of bearings substantially coplanar with and at right angles to the first pair of bearings for supporting diametrically opposite portions of the supporting ring on the annular portion of the governor lever, at least one pair of the bearings being in the form of knife edge bearings to eliminate vibration of the governor lever.

RAYMOND SHEPPARD.